(No Model.)

F. E. KEYES.
BORING MACHINE.

No. 384,854. Patented June 19, 1888.

Witnesses,
Jas. J. Maloney
W. E. Heil

Inventor,
Frank E. Keyes,
by Jos. P. Livermore,
Att'y.

UNITED STATES PATENT OFFICE.

FRANK EUGENE KEYES, OF PETERBOROUGH, ASSIGNOR TO THE AMOSKEAG INDURATED FIBRE WARE COMPANY, OF MANCHESTER, NEW HAMPSHIRE.

BORING-MACHINE.

SPECIFICATION forming part of Letters Patent No. 384,854, dated June 19, 1888.

Application filed January 3, 1888. Serial No. 259,630. (No model.)

*To all whom it may concern:*

Be it known that I, FRANK EUGENE KEYES, of Peterborough, county of Hillsborough, State of New Hampshire, have invented an Improvement in Boring-Machines, of which the following description, in connection with the accompanying drawings, is a specification, like letters on the drawings representing like parts.

My invention relates to a boring-machine adapted for boring the holes that are to receive rivets for attaching the handles to buckets, tubs, &c. It is essential for good work that the rivet-holes should be accurately spaced and radial, and to effect this result the drills or boring-tools have to be carefully guided and the bucket or article to be bored has to be properly centered with relation to the drills.

In boring-machines of this kind heretofore commonly used the shafts of the drills or boring-tools have had a longitudinal movement in their bearings for the purpose of feeding the tool into the material being bored, and with such construction the drills are likely to run untrue, owing to the spring of the arbors and to the fact that said arbors when constructed to have longitudinal as well as rotary movement in their bearings soon become loose.

The object of the present invention is to remove these objections existing in boring-machines previously used, and to produce a machine in which the boring-tools run with great accuracy, and a machine which can be operated rapidly and is adjustable for boring articles of different size and shape.

The machine comprises a bed or frame provided with converging guides or ways and tool-carriages movable on said guides, and feed mechanism common to all said tool-carriages, by which all may be fed forward or retracted simultaneously, and a platform or support and centering device for the article to be bored. The said guides, as herein shown, all converge to a common center and are adjustable both as to their divergence from one another in a horizontal plane and as to the angle or inclination to the horizontal plane. The supporting-platform for the article to be bored is shown as movable vertically, so that different sets of holes may be bored without removing the article from the platform, for the purpose hereinafter explained.

Figure 1:
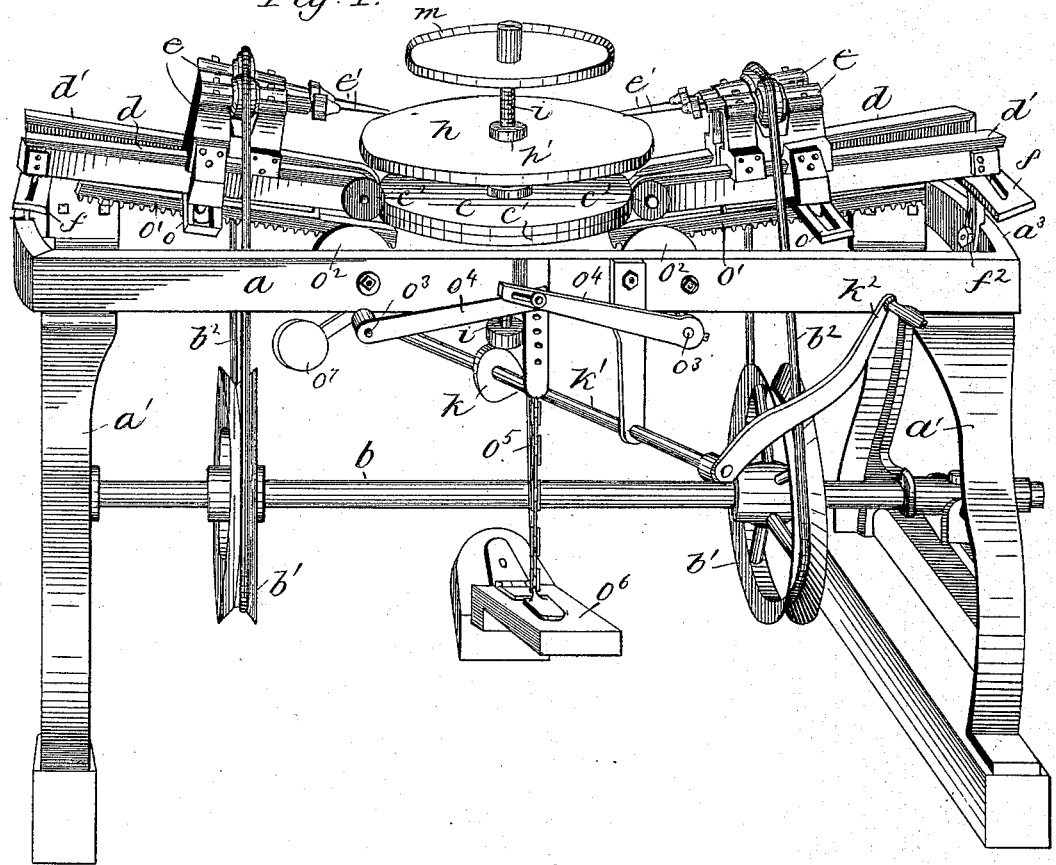
Figure 2:
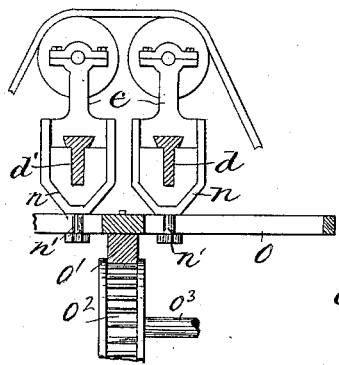
Figure 3:
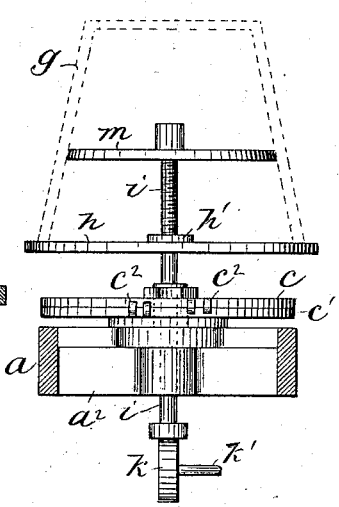

Figure 1 is a perspective view of a boring-machine embodying this invention; Fig. 2, a sectional detail showing the tool-carriages in end elevation and their guides and a portion of the feeding mechanism in section; Fig. 3, a central vertical section of the machine, showing one of the articles to be bored in dotted lines, and Figs. 4 and 5 details to be referred to.

The operative parts of the machine are supported on a bed or frame, $a$, provided with legs $a'$, having bearings for the main actuating-shaft $b$, carrying pulleys $b'$, for driving the actuating-belts $b^2$ for the boring-tools. The said shaft $b$ may be driven by a belt and pulley, or in any other suitable manner.

The frame $a'$ has a central cross-rib, $a^2$, (see Fig. 3,) which supports two concentric disks, $c\ c'$, provided with ears $c^2$, in which the inner ends of the guides or ways $d\ d'$ for the tool-carriages $e$ are pivoted, the outer ends of said guides being horizontally adjustable in supports $f$, which are themselves vertically adjustable on the end portions, $a^3$, of the main frame, being held when adjusted at the proper height by a clamp or bolt, $f^2$, as shown at the right-hand end of Fig. 1.

One diagonally-opposite pair of guides, $d$, is connected with one of the plates, as $c$, and the other pair, $d'$, is connected with the other plate, $c'$, so that as the outer ends of the guides are adjusted horizontally on the supports $f$ the said plates $c\ c'$ will turn on their axes at the middle of the bed, and the guides will thus always point toward a common center, and will thus direct the tool-carriages $e$ and the boring-tools $e'$, which may be drills of usual construction, in a path radial to the bucket, tub, or other round article to be bored, which is indicated in dotted lines at $g$, Fig. 3, and by such horizontal adjustment of the guides the pairs of holes made at opposite sides of the article may be bored at the required distance apart.

The vertical adjustment of the outer ends of the carriages, permitted by the pivoting of the inner ends of the ears $c^2$, enables the boring-tools to be brought at right angles to the slant height of the bucket or tub $g$, the inclination of which may vary in different articles, being, for example, generally greater in a bucket than in a tub.

The article $g$ to be bored is supported on a platform, $h$, which may be fastened upon a rod, $i$, by a nut, $h'$, the said rod being vertically movable in the central portion, $a^2$, of the frame-work and resting at its lower end on a cam, $k$, supported on a shaft, $k'$, operated by a handle, $k^2$. If but one set of holes is to be bored, the said shaft $i$ may be stationary, and the cam $k$ might in such case be omitted.

The shaft $i$ is extended above the supporting-platform $h$, and is provided with a centering device, $m$, which engages the interior of the article and centers it on the platform $h$, as shown in Fig. 3.

The boring-tools $e'$ are connected by suitable chucks with arbors running in bearings in the tool-carriages $e$, as best shown in Fig. 2, and the said carriages are dovetailed or otherwise suitably connected with guides $d\ d'$, so as to slide thereon without lateral motion.

The arbors are each provided with a pulley, and the two pulleys and corresponding arbors are supported by a single belt, $b^2$, as best shown in Fig. 2.

For the purpose of feeding all the tool-carriages and retracting them simultaneously the said carriages are connected with the stirrup-pieces $n$, extending below the guide and provided with studs $n'$, (see Fig. 2,) entering grooves in cross-arms $o$, connected with racks $o'$, (best shown in Fig. 1,) meshing with gears $o^2$, connected with shafts $o^3$, provided with levers $o^4$, both connected by a chain, $o^5$, or equivalent device, with a treadle, $o^6$, so that the operator, by depressing the said treadle, causes all four of the carriages to move forward simultaneously. The said carriages may be retracted by a weight or spring—as, for example, by a counter-weight, $o^7$, connected with one of the shafts $o^3$.

Figure 4:
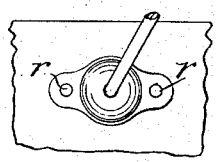

Fig. 4 represents the clip for attachment of the handle of a pail, two of which clips are connected with the pail, at opposite sides thereof, near its upper edge, each by two rivets, $r$, the holes for which are bored by one of the pairs of tools.

Figure 5:
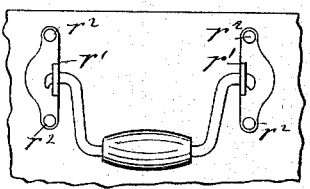

On wash-tubs two separate handles are commonly employed, one of which is shown in Fig. 5, each connected with the sides of the tub by two ears or clips, $r'$, each of which ears is connected with two rivets, $r^2$, so that two pairs of rivet-holes are required, one at greater distance from the edge of the tub than the other.

When the machine is to be used for boring wash-tubs, the platform $h$ and centering device $m$ are removed from the shaft $i$ and others of suitable size substituted, and the guides $d\ d'$ are properly adjusted and the cross-arms $o$ of the feeding mechanism are connected with the proper part of the racks $o'$, so that the traverse of the carriages is nearer the outer ends of the guides $d\ d'$ than shown in Fig. 1. Then when the shaft $i$ rests on the part of the cam $k$ of least diameter the platform $h$ is in its lowest position and the pair of holes farthest from the edge of the tub are bored by feeding forward the tool-carriages. Then the operator turns the handle $k^2$, so that the part of the cam $k$ of largest diameter comes under the shaft $i$, and in so doing raises the said shaft and the platform $h$ and tub centered thereon a distance equal to the distance between the two sets of holes required, and the tools are again fed forward and thus bore the other set of holes which are nearest the edge of the tub. By this arrangement there is no danger of the position of the tub being changed, except vertically, between the two operations, so that the two sets of holes are in the same radial planes, and it is obvious that, if desired, three or more sets of holes might be made at different distances from the edge of the tub or article being bored, but all at the same inclination to the side wall of the tub and all directed exactly to the center of the tub, and by having the arbors of the boring-tools run in the bearings without longitudinal movement they can be made to run with great accuracy and without vibration or side movement, so that all the articles may be bored with absolute uniformity and the rivets will fit exactly when engaged with the metal ears, and will thus afford a much stronger fastening than when they have to be strained or pulled aside to get them into the openings in the metal ears, as is the case when the rivet-holes are not bored with accuracy and uniformity.

I claim—

1. In a boring-machine, the combination of a number of guideways and two carriages longitudinally movable thereon, with arbors having their bearings solely on said tool-carriages, as described, whereby the boring-tools operated by said arbors are advanced or fed solely by the movement of said tool-carriages and without longitudinal movement of the arbors in any of their bearings, substantially as described.

2. The combination of a series of converging guideways with pivoted central supports for said guideways and outer supports for said guideways, on which the outer ends of the said guideways are laterally adjustable, as described, whereby the angle between the said guideways may be varied without changing the common center or axis toward which they converge, substantially as described.

3. A series of guideways and tool-carriages moving thereon, the guideways being pivotally supported at one end, combined with vertically-adjustable supports for the other ends of said guideways, substantially as described.

4. The combination of two pairs of guideways and tool-carriages movable thereon, with feeding devices connected with each pair of tool-carriages, and actuating mechanism connected with both said feeding devices, whereby the four tool-carriages are moved on their corresponding guideways simultaneously, substantially as described.

5. The combination of a support and centering device for the article to be bored, with a series of guideways radially arranged with relation to said support, and tool-carriages movable on said guideways, and feed mechanism therefor, substantially as described.

6. The combination of a support and a centering device for the article to be bored, with a sliding shaft for moving said support vertically, and a series of guideways converging toward said support, and tool-carriages moving on said guideways, substantially as described.

7. The two pairs of guideways and tool-carriages movable thereon, combined with the slotted cross-arms engaged with the said tool-carriages, rack-bars connected with said cross-arms, and gears connected with said rack-bars, substantially as described.

In testimony whereof I have signed my name to this specification in the presence of two subscribing witnesses.

FRANK EUGENE KEYES.

Witnesses:
M. L. MORRISON,
F. G. SHUKE.